(12) United States Patent
Okamoto et al.

(10) Patent No.: US 10,071,711 B2
(45) Date of Patent: Sep. 11, 2018

(54) COATING AGENT FOR WIPER BLADE RUBBER AND WIPER BLADE RUBBER USING SAME

(71) Applicants: FUKOKU CO., LTD., Saitama (JP); UBE INDUSTRIES, LTD., Yamaguchi (JP)

(72) Inventors: Yasuyuki Okamoto, Saitama (JP); Atsushi Morikami, Yamaguchi (JP); Masahiro Naiki, Yamaguchi (JP)

(73) Assignee: FUKOKU CO., LTD., Saitama (JP)

( * ) Notice: Subject to any disclaimer, the term of this patent is extended or adjusted under 35 U.S.C. 154(b) by 0 days.

(21) Appl. No.: 15/025,845

(22) PCT Filed: Nov. 27, 2014

(86) PCT No.: PCT/JP2014/081380
§ 371 (c)(1),
(2) Date: Mar. 29, 2016

(87) PCT Pub. No.: WO2015/080202
PCT Pub. Date: Jun. 4, 2015

(65) Prior Publication Data
US 2016/0272158 A1 Sep. 22, 2016

(30) Foreign Application Priority Data

Nov. 27, 2013 (JP) ................................ 2013-245251

(51) Int. Cl.
*B60S 1/38* (2006.01)
*C09D 7/40* (2018.01)
(Continued)

(52) U.S. Cl.
CPC ................ *B60S 1/38* (2013.01); *C08G 18/44* (2013.01); *C08J 7/047* (2013.01); *C09D 5/00* (2013.01);
(Continued)

(58) Field of Classification Search
CPC .. C10M 103/02; C10M 2201/041; B60S 1/38; B60S 2001/3829; C09D 5/00; C09D 7/40; C09D 7/69; C09D 175/04; C09D 175/06; C08K 3/04; C08K 2201/003; C08J 7/047; C08J 231/00; C08J 2475/04; C08G 18/44; C10N 2250/08
(Continued)

(56) References Cited

U.S. PATENT DOCUMENTS 6,682,779 B1 1/2004 Wefringhaus et al.
6,696,391 B2 * 2/2004 Goto ........................ B60S 1/38
15/250.001
(Continued)

FOREIGN PATENT DOCUMENTS

JP 2002020695 A 1/2002
JP 2003253214 A 9/2003
(Continued)

OTHER PUBLICATIONS

Spirkova, M., Pavlicevic, J., Strachota, A., Poreba, R., Bera, O., Kapralkova, L., Baldrian, J., Slouf, M., Lazic, N., Budinski-Simendic, J., "Novel polycarbonate-based polyurethane elastomers: Composition-property relationship", European Polymer Journal, 2011, 959-972.*
(Continued)

*Primary Examiner* — James Goloboy
(74) *Attorney, Agent, or Firm* — Holtz, Holtz & Volek PC

(57) ABSTRACT

A coating agent for a wiper blade rubber having superior friction performance and wiping performance, both initially and during use for an extended period, and having superior durability by inhibiting wear and the like, and a wiper blade rubber using the same. The coating agent for the wiper blade rubber includes a solid lubricant and a binder containing a polycarbonate-based polyurethane resin. The wiper blade rubber has the coating agent on both lateral surfaces of a lip portion of the wiper blade rubber.

13 Claims, 4 Drawing Sheets

(51) Int. Cl.
- *C08K 3/04* (2006.01)
- *C10M 113/02* (2006.01)
- *C09D 175/04* (2006.01)
- *C08J 7/04* (2006.01)
- *C09D 5/00* (2006.01)
- *C10M 103/02* (2006.01)
- *C09D 175/06* (2006.01)
- *C08G 18/44* (2006.01)

(52) U.S. Cl.
CPC ............... *C09D 7/40* (2018.01); *C09D 7/69* (2018.01); *C09D 175/04* (2013.01); *C09D 175/06* (2013.01); *C10M 103/02* (2013.01); *B60S 2001/3829* (2013.01); *C08J 2321/00* (2013.01); *C08J 2475/04* (2013.01); *C08K 3/04* (2013.01); *C08K 2201/003* (2013.01); *C10M 2201/041* (2013.01); *C10N 2250/08* (2013.01)

(58) Field of Classification Search
USPC .................................................. 508/109, 113
See application file for complete search history.

(56) References Cited

U.S. PATENT DOCUMENTS

| | | |
|---|---|---|
| 2006/0046047 A1 | 3/2006 | Wilms et al. |
| 2012/0149611 A1* | 6/2012 | Yamaguchi ............ C08J 7/047 508/107 |

FOREIGN PATENT DOCUMENTS

| | | |
|---|---|---|
| JP | 2005529791 A | 10/2005 |
| JP | 2015004040 A | 1/2015 |
| JP | 2015007155 A | 1/2015 |
| WO | 2011021725 A1 | 2/2011 |
| WO | 2014038565 A1 | 3/2014 |
| WO | 2014208191 A1 | 12/2014 |

OTHER PUBLICATIONS

International Search Report (ISR) dated Mar. 10, 2015 issued in International Application No. PCT/JP2014/081380.

Extended European Search Report (EESR) (in English) dated Jun. 22, 2017 issued in counterpart European Application No. 14866551.6.

* cited by examiner

COATING AGENT FOR WIPER BLADE RUBBER AND WIPER BLADE RUBBER USING SAME

TECHNICAL FIELD

The present invention relates to a coating agent for wiper blade rubber, which is used in wiper devices for wiping fine particles of rainwater, snow or dust, and to wiper blade rubber using the same.

BACKGROUND ART

Sliding members in the form of wipers are used in transportation equipment such as vehicles, aircraft or marine vessels, and industrial machinery and equipment such as construction machinery, in order to wipe off water and fine particles adhered to their glass and other smooth surfaces. Wiper blade rubber is attached to the sliding portions of the wipers. For example, in the case of automobile windshield wipers, rainwater, snow, dust or mud and the like adhered to a glass surface are removed by a wiping operation of the wiper blade rubber with the driving of the wiper. Although resin elastomers and the like are used for the base material of wiper blade rubber in addition to rubber, it is rubber that is used most commonly.

In the case of wiping off rainwater adhered to a glass surface of an automobile and the like, together with removing dust and mud adhered to the glass surface, the wiper blade rubber serves to prevent scattering of transmitted light by creating a uniformly wet state by evenly spreading out rainwater into a uniform water film, thereby ensuring the driver's field of view. However, due to adherence of dirt or wax and the like adhered to the glass surface of an automobile and the like, unevenness occurs in the frictional state of the glass surface, thereby preventing the sliding characteristics of the wiper blade rubber from being uniform when sliding over the glass surface, and resulting in problems such as "skipping", which occurs when the wiper blade rubber repeatedly sticks and slips over the glass surface, "streaking", which occurs when the glass is only partially wiped resulting in the formation of lines, or "uneven wiping", which occurs when the water film is only partially removed. In addition, problems may also occur such as "chattering", which occurs due to skipping of the wiper blade rubber over the glass, and "squeaking", which occurs due to the wiper blade rubber undergoing self-excited vibration and hitting the glass surface caused by sliding over a site of high friction on the glass surface. Needless to say, since the driver is required to concentrate on driving, sound produced by windshield wipers is preferably as little as possible.

Water repellency treatment has recently come to be performed on the glass surfaces of automobiles and the like. Since water is inhibited from adhering to glass surfaces that have undergone this water repellency treatment due to the water-repelling effect thereof, it becomes difficult to form a uniform water film, friction between the wiper blade rubber and the glass increases, and problems such as skipping, streaking, uneven wiping, chattering and squeaking occur. In addition, the large amount of friction between the wiper blade rubber and the glass would cause the problem of disadvantageous acceleration of the damages to the wiper blade rubber and water repellency treatment film on the glass.

In order to suppress these "skipping", "streaking" and "uneven wiping" (to be collectively referred to as "uneven wiping") or "chattering" and "squeaking" (to be collectively referred to as "wiping noise"), a coating agent for wiper blade rubber has been proposed in order to form a coating layer for reducing the friction between the rubber material and the glass on the surface of the base material that contacts the glass during sliding of the wiper blade (Patent Document 1).

PRIOR ART DOCUMENTS

Patent Documents

Patent Document 1: JP 2002-20695 A

DISCLOSURE OF THE INVENTION

Problems to be Solved by the Invention

In order to reduce uneven wiping or wiping noise and inhibit wear of wiper blade rubber, it is preferable to reduce friction between the wiper blade rubber and the wiped surface (the glass surface). In order to realize this, it has been considered to provide a hard coating layer on the wiper blade rubber. However, in the case the elastic modulus of the coating layer is too large and the coating layer is too hard, the wiper blade rubber wears easily due to repeatedly sliding over the glass surface, thereby making it difficult to maintain wiping performance over a long period of time. In addition, in the case the elastic modulus of the coating layer is too large and the coating layer is too hard, the followability of the wiper blade rubber over a glass surface such as automobile windshield glass having a curved surface (glass curved surface) becomes poor, thereby making it difficult to inhibit the occurrence of problems such as uneven wiping.

On the other hand, in the case of prioritizing the followability of the glass curved surface by reducing the elastic modulus of the wiper blade rubber and providing a soft coating layer, in the case the wiper blades are held at the stop position for a long period of time, problems occur such as the wiper blade rubber easily adhering to the glass surface, thereby resulting in an increase in the coefficient of friction when sliding is resumed.

An object of the present invention is to provide a coating agent for wiper blade rubber that demonstrates superior friction performance, capable of maintaining a low level of friction both initially and during use for extended periods, and superior wiping performance, capable of adequately inhibiting uneven wiping and wiping noise, while also imparting superior durability by inhibiting wear, and to provide a wiper blade rubber that uses the same.

Means for Solving the Problems

The inventors of the present invention conducted extensive studies to solve the aforementioned problems, thereby accomplishing the present invention. Namely, the present invention has the configurations indicated below.

Present Invention 1 relates to a coating agent for wiper blade rubber, comprising a binder containing a polycarbonate-based polyurethane resin, and a solid lubricant.

Present Invention 2 relates to the coating agent for wiper blade rubber described in Present Invention 1, wherein the polycarbonate-based polyurethane resin is a crosslinking polycarbonate-based polyurethane resin and/or a non-crosslinking polycarbonate-based polyurethane resin.

Present Invention 3 relates to the coating agent for wiper blade rubber described in Present Invention 1 or 2, wherein the weight ratio of the binder solid fraction to the solid lubricant is 1:1 to 1:8.

Present Invention 4 relates to the coating agent for wiper blade rubber described in any of Present Inventions 1 to 3, wherein the solid lubricant is graphite having an average particle diameter ($D_{50}$) of 2 μm to 15 μm as measured according to the laser diffraction scattering method.

Present Invention 5 relates to the coating agent for wiper blade rubber described in any of Present Inventions 1 to 4, wherein the polycarbonate-based polyurethane resin is dispersed in an aqueous medium.

Present Invention 6 relates to the coating agent for wiper blade rubber described in any of Present Inventions 1 to 5, wherein the binder has a tensile elasticity, as determined in compliance with JIS K7161-1 using a film having a film thickness of 10 μm to 80 μm and width of 3 mm to 20 mm obtained by drying or curing the binder, of 20 MPa to 1300 MPa.

Present Invention 7 relates to the coating agent for wiper blade rubber described in any of Present Inventions 1 to 6, wherein the binder has tensile strength of 35 MPa or more and elongation of 100% or more as determined in compliance with JIS K7311 using a film having a film thickness of 10 μm to 80 μm and width of 3 mm to 20 mm obtained by drying or curing the binder. Present Invention 8 relates to a wiper blade rubber provided with a coating layer comprising the coating agent for wiper blade rubber described in any of Present Inventions 1 to 7 on the lateral surfaces of a lip portion of the wiper blade rubber.

Present Invention 9 relates to the wiper blade rubber described in Present Invention 8, wherein the thickness of the coating layer is 3 μm to 30 μm.

Effects of the Invention

According to the present invention, a coating agent for wiper blade rubber that demonstrates superior friction performance and wiping performance both initially and during use for extended periods and imparts superior durability by inhibiting wear, and a wiper blade rubber that uses the same, can be provided.

DESCRIPTION OF EMBODIMENTS

Figure 1:
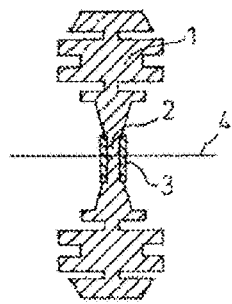
FIG. 1 is a cross-sectional view of a wiper blade rubber having a coating layer on the lip portion thereof.

The following provides an explanation of the coating agent for wiper blade rubber of the present invention along with a wiper blade rubber that uses that coating agent.

The coating agent for wiper blade rubber of the present invention comprises a binder containing a polycarbonate-based polyurethane resin, and a solid lubricant.

The polycarbonate-based polyurethane resin contained in the binder is a polyurethane resin having units derived from a polycarbonate polyol, and is synthesized in the form of a dispersion dispersed in an aqueous medium or solution dissolved in an organic solvent.

The polycarbonate-based polyurethane resin is a crosslinking polycarbonate-based polyurethane resin and/or a non-crosslinking polycarbonate-based polyurethane resin.

A crosslinking polycarbonate-based polyurethane resin is a polycarbonate-based polyurethane resin that is crosslinkable by imparting energy. Examples of the imparted energy include radiation energy and thermal energy.

Examples of radiation capable of imparting radiation energy that can be used include infrared rays, visible light, ultraviolet rays, X rays, electron beams, α rays, β rays and γ rays. In the case of crosslinking a crosslinking polycarbonate-based polyurethane resin by imparting radiation energy, although there are no particular limitations on the amount of radiation energy and can be suitably selected depending on the type of radiation energy, a polycarbonate-based polyurethane resin can be crosslinked by irradiating with radiation energy of, for example, 100 mJ/cm² to 3,000 mJ/cm². In addition, in the case of crosslinking a thermal crosslinking polycarbonate-based polyurethane resin by imparting thermal energy, although there are no particular limitations on the temperature at which the resin is heated, a polycarbonate-based polyurethane resin can be heated and crosslinked at a temperature of, for example, 50° C. to 200° C. The crosslinking polycarbonate-based polyurethane resin is preferably a thermal crosslinking polycarbonate-based polyurethane resin that forms a urethane crosslinked structure by being heated to 80° C. to 200° C. An example of a binder containing a crosslinking polycarbonate-based polyurethane resin is Eternacoll® UW-1501F (Ube Industries, Ltd.).

A non-crosslinking polycarbonate-based polyurethane resin is a polycarbonate-based polyurethane resin that does not crosslink even if imparted with energy. An example of a binder containing a non-crosslinking polycarbonate-based polyurethane resin is Etemacoll® UW-5002 (Ube Industries, Ltd.).

In the case the binder contains a crosslinking polycarbonate-based polyurethane resin and a non-crosslinking polycarbonate-based polyurethane resin, there are no particular limitations on the mixing ratio thereof. In the case the binder contains a crosslinking polycarbonate-based polyurethane resin and a non-crosslinking polycarbonate-based polyurethane resin, the mixing ratio of the crosslinking polycarbonate-based polyurethane resin and the non-crosslinking polycarbonate-based polyurethane resin can be suitably set so that tensile elasticity, as determined in compliance with JIS K7161-1 using a film having a film thickness of 10 μm to 80 μm and width of 3 mm to 20 mm obtained by drying or curing the binder, is 20 MPa to 1,300 MPa.

The content of the polycarbonate-based polyurethane resin (solid fraction) in the binder is preferably 15% by weight to 45% by weight and more preferably 20% by weight to 40% by weight, based on the total weight of the binder (100% by weight). The viscosity of the binder at 20°

C. is preferably 10 mPa·s to 200 mPa·s and more preferably 20 mPa·s to 100 mPa·s. The viscosity of the binder can be measured using, for example, a tuning fork vibration viscometer as described in the following examples.

An example of a dispersion medium in which the polycarbonate-based polyurethane resin is dispersed is an aqueous medium. An example of a solvent that dissolves the polycarbonate-based polyurethane resin is an organic solvent. An aqueous medium is preferably used in the binder in consideration of emission standards for volatile organic compounds (VOC). Examples of aqueous media include water and mixed media of water and a hydrophilic organic solvent.

Although examples of water include deionized water, distilled water and ultrapure water, deionized water is used preferably in consideration of such factors as dispersion stability.

Examples of hydrophilic organic solvents include lower primary alcohols such as methanol, ethanol or propanol, polyvalent alcohols such as ethylene glycol or glycerin, and aprotic hydrophilic organic solvents such as dimethylsulfoxide, dimethylformamide, N-methylpyrrolidone and N-ethylpyrrolidone.

The amount of hydrophilic organic solvent in the aqueous medium is preferably 0% by weight to 20% by weight and more preferably 0% by weight to 10% by weight based on 100% by weight of the aqueous medium.

Examples of organic solvents that can be used include toluene, xylene, butyl acetate, dimethylformamide, dimethylacetoamide, N-methylpyrrolidone and N-ethylpyrrolidone.

Tensile elasticity of the coating layer provided on the wiper blade rubber varies depending on the binder contained in the coating agent for wiper blade rubber. Tensile elasticity of the binder can be measured using a film of a prescribed thickness and width obtained by drying or curing the binder contained in the coating agent for wiper blade rubber. It is expected that a hard coating layer is obtained when a binder contained in the coating agent for wiper blade rubber forming a film having a high tensile elasticity is used. It is expected that a soft coating layer is obtained when a binder contained in the coating agent for wiper blade rubber forming a film having a low tensile elasticity is used. Here, in wiper blade rubber used in applications for obtaining a good visibility by wiping a glass surface of an automobile and the like, a hard coating layer usually refers to the coating layer having a Martens hardness of 20 N/mm² or more as measured in compliance with ISO14577-1, while a soft coating layer usually refers to the coating layer having a Martens hardness of less than 20 N/mm² as measured in compliance with ISO14577-1. In the present description, Martens hardness of a coating layer measured in compliance with ISO14577-1 is indicated as "surface hardness". Since the coating layer provided on wiper blade rubber is comprised of a binder containing a polycarbonate-based polyurethane resin and a solid lubricant, different values are obtained on different contact sites of-the indenter of the device used to measure surface hardness and the sample. Consequently, the more frequently the surface hardness is measured the stabler the values of "surface hardness" become.

Tensile elasticity, as measured in compliance with JIS K7161-1 using a film having a film thickness of 10 μm to 80 μm and width of 3 mm to 20 mm obtained by drying or curing the binder containing the polycarbonate-based polyurethane resin, is preferably 20 MPa to 1,300 MPa, more preferably 20 MPa to 1,290 MPa and even more preferably 25 MPa to 1,280 MPa.

If tensile elasticity, as measured in compliance with JIS K7161-1 using a film of a specific size obtained by drying or curing the binder containing the polycarbonate-based polyurethane resin, is within the range of 20 MPa to 1,300 MPa, the coating layer applied to the wiper blade rubber is soft and stretches favorably, thereby making it possible to demonstrate favorable followability to the glass surface, inhibit the occurrence of uneven wiping and the like, and demonstrate favorable wiping performance.

If tensile elasticity, as measured in compliance with JIS K7161-1 using a film obtained by drying or curing the binder containing a polycarbonate-based polyurethane resin, is less than 20 MPa, the binder sometimes fails to provide a sufficiently small coefficient of friction of a wiper blade rubber provided with a coating layer composed of the coating agent for wiper blade rubber. If tensile elasticity, as measured in compliance with JIS K7161-1 using a film obtained by drying or curing the binder containing a polycarbonate-based polyurethane resin, exceeds 1,300 MPa, the binder sometimes provides an excessively hard wiper blade rubber, and a poor wiping performance of a wiper blade rubber provided with a coating layer composed of the coating agent for wiper blade rubber.

Tensile elasticity in compliance with JIS K7161-1 can be determined under the measuring conditions including a measuring temperature of 23° C., humidity of 50% and pulling speed of 100 mm/min as explained in the following examples.

Since the coating layer applied to the wiper blade rubber comprises a binder containing a polycarbonate-based polyurethane resin, and a solid lubricant, the coating layer would influence the coefficient of friction and wiping performance also through the weight ratio of the binder solid fraction to the solid lubricant.

A film having a film thickness of 10 μm to 80 μm and width of 3 mm to 20 mm obtained by drying or curing a binder containing a polycarbonate-based polyurethane resin preferably has a tensile strength and elongation, in compliance with JIS K7311, of 35 MPa or more and 100% or more, more preferably a tensile strength of 45 MPa or more and elongation of 200% or more, and even more preferably a tensile strength of 50 MPa or more and elongation of 250% or more.

If the tensile strength and elongation in compliance with JIS K7311 of a film having a prescribed size obtained by drying or curing a binder containing polycarbonate-based polyurethane resin are 35 MPa or more and 100% or more, respectively, the coating layer composed of a coating agent for wiper blade rubber adhered to a rubber composing a base material of a wiper blade rubber such as chloroprene rubber or natural rubber has a favorable wear resistance, a capability to follow deformations in the base material, and suppressed cracking and separation of the coating layer.

Tensile strength and elongation in compliance with JIS K7311 can be determined under measuring conditions including a measuring temperature of 23° C., humidity of 50% and pulling speed of 100 mm/min as explained in the following examples.

The solid lubricant is a self-lubricating solid material, and any conventionally known solid lubricant can be used. Examples thereof include graphite, molybdenum disulfide, tungsten disulfide, polytetrafluoroethylene (PTFE), silver, lead and copper. Of these, graphite is preferable since it reduces the coefficient of friction. The graphite is preferably flake graphite. The particle diameter of the solid lubricant in terms of the volume-based average particle diameter ($D_{50}$) measured according to laser diffraction scattering method is preferably 2 µm to 15 µm, more preferably 3 µm to 12 µm, even more preferably 3 µm to 10 µm, and particularly preferably 3.0 µm to 8.0 µm. A device such as MT3300 Microtrac Particle Size Distribution Analyzer (Nikkiso Co., Ltd.) can be used to measure average particle diameter according to laser diffraction scattering method. In the case the solid lubricant is in the form of flakes, average particle diameter refers to the length of the major axis. In the case the solid lubricant is spherical, average particle diameter refers to the diameter thereof.

In the coating agent for wiper blade rubber of the present invention, the weight ratio of binder solid fraction to solid lubricant (binder solid fraction: solid lubricant) is preferably 1:1 to 1:8, more preferably 1:2 to 1:7, even more preferably 1:2 to 1:6, and particularly preferably 1:3 to 1:6.

According to the present invention, attributable to the incorporation of a binder containing a polycarbonate-based polyurethane resin into the coating agent for wiper blade rubber, the amount of solid lubricant can be increased and the coefficient of friction of the coating layer formed can be reduced in comparison with coating agents into which a binder containing a polyol polyether-based polyurethane resin is incorporated or coating agents into which a binder containing a phenol resin and either chloroprene rubber-based or chlorosulfonated polyethylene is incorporated. In addition, even in the case of having increased the amount of solid lubricant in the coating agent, the adhesion between the coating layer composed of a coating agent for wiper blade rubber and the base material is still favorable, and the wear of the coating layer can be inhibited even after an extended period of time of use of the wiper blade.

If the weight ratio between the binder solid fraction and the solid lubricant (binder solid fraction: solid lubricant) is 1:1 to 1:8 and particularly 1:2 to 1:7, there can be formed a coating layer for wiper blade rubber having a superior friction performance and wiping performance both initially and after an extended period of time of use, superior adhesion to a base material,
suppressed wear and superior durability. The wiper blade rubbers provided with the coating layer composed of this coating agent for wiper blade rubber have superior wear resistance, wipeability and durability.

The coating agent for wiper blade rubber of the present invention can be produced by using a binder in the form of a dispersion obtained by dispersing a polycarbonate-based polyurethane resin in an aqueous medium, or in the form of a solution obtained by dissolving a polycarbonate-based polyurethane resin in an organic solvent, and dispersing and mixing a solid lubricant in this binder. A known method can be used to disperse and mix the solid lubricant in the binder, and examples thereof include dispersing and mixing by using a bead mill, ball mill or dissolver. In addition, filler, surfactant, dispersant, thickener or preservative and the like may also be incorporated provided it does not impair the object and effect of the present invention.

Next, an explanation is provided of a wiper blade rubber that uses the coating agent for wiper blade rubber of the present invention.

FIG. 1 is a cross-sectional view showing a wiper blade rubber formed in a tandem shape.

The wiper blade rubber has a tandem shape in which the ends of two wiper blade rubber base materials 1 are in contact. The coating agent for wiper blade rubber of the present invention is coated onto both sides of a lip portion 2 of the wiper blade rubber base material 1, followed by drying or curing to form a coating layer 3. Subsequently, the center of the lip portion 2 is cut (cut portion indicated by reference symbol 4 in FIG. 1) to form a wiper blade rubber having the coating layer 3 on both sides of the lip portion 2 with the rubber base material exposed on the end surface of the lip portion.

Examples of rubber that can be used to compose the wiper blade rubber base material include natural rubber, styrene-butadiene rubber, chloroprene rubber, ethylene-propylene-diene rubber (EPDM), ethylene-propylene rubber and mixtures thereof. In addition, resin elastomers can be used depending on the application.

A known method can be used to coat the coating agent, and examples thereof include spray coating, knife coating, roller coating and dipping.

Although there are no particular limitations thereon, the thickness of the coating layer after drying or curing is preferably 3 µm to 30 µm, more preferably 3 µm to 15 µm, and particularly preferably 5 µm to 12 µm. If the thickness of the coating layer is 5 µm to 12 µm, the coefficient of friction can be reduced while ensuring followability to the rubber base material, wear can be inhibited and superior durability can be obtained. If the thickness of the coating layer is less than 3 µm, the coefficient of friction cannot be reduced, and since the coating layer is easily lost during use, uneven wiping or wiping noise occurs easily. If the thickness of the coating layer exceeds 30 µm, the coating agent is unable to follow the curvature of the glass thereby resulting in increased susceptibility to the occurrence of uneven wiping.

EXAMPLES

The following provides a more detailed explanation of the present invention through examples and comparative examples. The present invention is not limited to the following examples and comparative examples. In the examples and comparative examples, the term "parts" refers to "parts by weight", while the term "percent (%)" refers to "percent by weight (wt %)".

[Measurement of Viscosity]

Viscosity was measured at 23° C. using a tuning fork vibration viscometer.

[Measurement of Tensile Elasticity, Tensile Strength and Elongation]

Tensile elasticity, tensile strength and elongation were measured by forming a film having a film thickness of 10 µm to 80 µm and width of 5 mm by drying or curing a binder and subjecting this film to measurements in compliance with JIS K7161-1 and JIS K7311 at a measuring temperature of 23° C., humidity of 50% and pulling speed of 100 mm/min.

[Binder A]

Binder A is an aqueous polycarbonate-based polyurethane resin dispersion (Etemacoll® UW-1501F, Ube Industries, Ltd.) comprising 30% by weight, as the solid content thereof, of a thermal crosslinking polycarbonate-based polyurethane resin based on the total weight (100% by weight) of Binder A, and containing a dispersion medium in the form of water and N-methylpyrrolidone. The viscosity of the Binder A is shown in Table 1. A film composed of Binder A was formed to a film thickness of 10 µm to 80 µm and width of 5 mm by drying or curing the Binder A. The film composed of Binder A was measured for tensile elasticity in compliance with JIS K7161-1, and measured for tensile strength and elongation in compliance with JIS K7311. The measurement results are shown in Table 1.

[Binder B]

Binder B contains a Resin Dispersion B, a curing agent and a dispersion medium. The resin dispersion, curing agent and dispersion medium contained in the Binder B are indicated below. The solid fraction of Binder B is 80% by weight based on the total weight (100% by weight) of the Binder B.

Resin Dispersion B: Resin Dispersion B contains 65% by weight as the solid content thereof of a polyol polyether-based urethane resin (Nippolan® 179P, Nippon Polyurethane Industry Co., Ltd.) based on 100% by weight of the resin dispersion, and contains propylene glycol monomethyl ether acetate as a dispersion medium. The viscosity of Resin Dispersion B is shown in Table 1. Curing agent: Polyisocyanate resin/(Coronate® 2513 (Nippon Polyurethane Industry Co., Ltd.)). Dispersion medium: Xylene/Cellosolve acetate A film composed of Binder B was formed to a film thickness of 10 μm to 80 μm and width of 5 mm by drying or curing the Binder B. The film composed of Binder B was measured for tensile elasticity in compliance with JIS K7161-1 and measured for tensile strength and elongation in compliance with JIS K7311. The measurement results are shown in Table 1.

[Binder C]

Binder C is a rubber-mixed mixture (Shoprene® AD, Showa Denko K.K.) having a solid content of 30% by weight based on the total weight (100% by weight) of Binder C and containing xylene as a dispersion medium. A film composed of Binder C was formed to a film thickness of 10 μm to 80 μm and width of 5 mm by drying or curing the Binder C. The film composed of Binder C was measured for tensile elasticity in compliance with JIS K7161-1 and measured for tensile strength and elongation in compliance with JIS K7311. The measurement results are shown in Table 1.

TABLE 1

| | Binder | | A | B | C |
|---|---|---|---|---|---|
| | Viscosity | mPa·s | 10-100 | 6,000-16,000 | 1,000-2,500 |
| Film | Tensile elasticity | MPa | 53 | 270 | 27 |
| | Tensile strength | MPa | 52 | 24 | 13 |
| | Elongation | % | 270 | 4.1 | 300 |

[Solid Lubricant]

Graphite was used that has an average particle diameter ($D_{50}$) of 3.8 μm as determined by laser diffraction scattering using MT3300 Microtrac Particle Size Distribution Analyzer (Nikkiso Co., Ltd.).

Example 1 and Comparative Examples 1 and 2

The coating agents of Example 1 and Comparative Examples 1 and 2 were obtained by mixing a binder, a solid lubricant and other materials in the incorporated amounts shown in Table 2 using a homodisperser stirrer. Furthermore, the values indicated in Table 2 are in parts by weight with the exception of the weight ratio of binder solid fraction to solid lubricant. The solid lubricant was added in small portions to the binder that had been preliminarily charged into the stirrer and the resultant mixture was stirred until individual particles reached an approximately uniform size based on visual observation without the presence of visually conspicuously large particles. In the case of using a curing agent, the curing agent was added to the coating agent and mixed well immediately prior to coating onto the wiper blade.

TABLE 2

| | | Example 1 | Comparative Example 1 | Comparative Example 2 |
|---|---|---|---|---|
| Binder (parts by weight) | A: Thermal crosslinking acqueous polycarbonate-based urethane resin dispersion | 10.56 | — | — |
| | B: Polyol polyether-based urethane resin | — | 4.70 | — |
| | C: Rubber-based mixture | — | — | 10.56 |
| Curing agent (parts by weight) | | — | 5.64 | — |
| Solid lubricant: graphite (parts by weight) | | 12.67 | 7.57 | 11.09 |
| Weight ratio of binder (solid fraction): solid lubricant | | 1:4 | 1:1 | 1:35 |
| Acqueous medium (parts by weight) | Pure water | 76.77 | — | — |
| Organic solvent (parts by weight) | Xylene | — | 22.09 | 29.35 |
| | Toluene | — | — | 35.00 |
| | Methyl ethyl ketone | — | 60.00 | — |
| | Acetone | — | — | 15.00 |

The resulting coating agents were coated onto the lip portion 2 of a tandem-shaped wiper blade rubber base material 1 so that the film thickness of the coating layer 3 after drying or curing was 5 μm to 12 μm as shown in FIG. 1, followed by drying at 130° C. to 140° C. for 0.5 hours to form the coating layer 3. After forming the coating layer, the center of the lip portion 2 was cut to obtain a wiper blade rubber having the coating layer 3.

The following tests were carried out using the coating agents for wiper blade rubber of Example 1 and Comparative Examples 1 and 2 and the wiper blade rubber using these coating agents. The results are shown in Table 3.

[Surface Hardness]

Surface hardness was measured in compliance with ISO14577-1 under the conditions indicated below. The results are shown in Table 2. The coating agents of the examples and comparative examples were each coated onto a test piece so that the thickness of the coating layer was 10 μm to obtain samples. Testing was carried out for 15 times or more on each test piece under the conditions indicated below, and the measured values were respectively designated as $S1 \geq S2 \geq \ldots \geq Sn$ in the order of decrease starting from the largest measured value. Here, n represents the last run number of the measured values.

Surface hardness was calculated from the measured values based on Equation 1 indicated below.

$$\text{Surface hardness} = 0.5 \times S1 + 0.3 \times S2 + 0.1 \times (\text{sum of } S3 \text{ to } Sn) \quad (1)$$

Measuring temperature: 23° C.
Humidity: 50%
Device: DUH-211S Dynamic Micro Hardness Tester (Shimadzu Corp.)

Testing conditions: Minimum testing force: 0.08 mN, load speed: 0.146 mN/sec, load holding time: 5 sec, set indentation depth: 2 μm, test piece: SUS304 base material Coating layer: 10 μm

[Wiping Sensory Evaluation]

Figure 2:
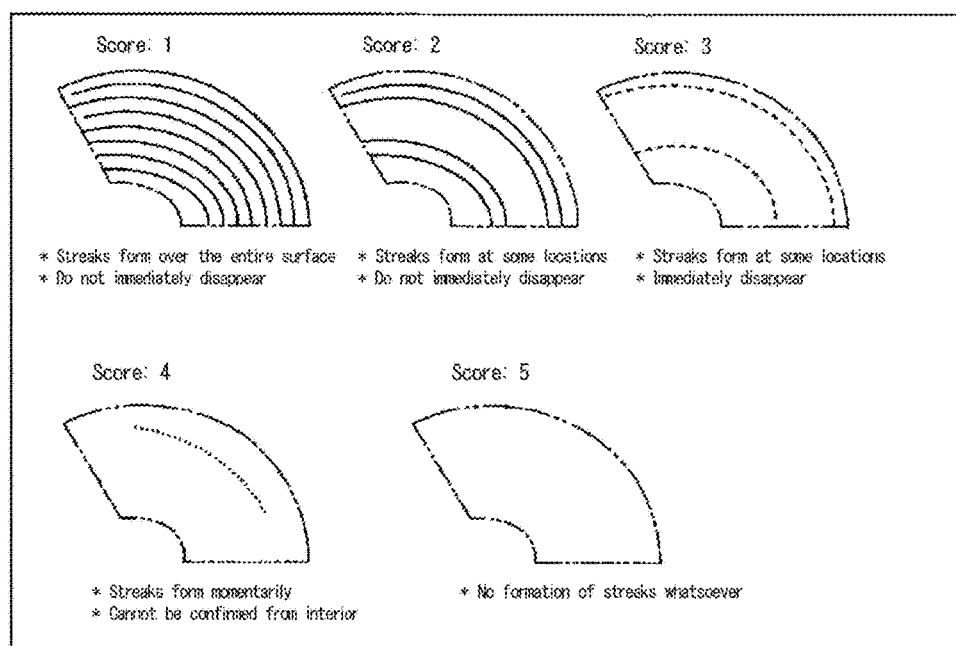
FIG. 2 is a pattern diagram schematically representing criteria of sensory evaluation scores.

A sensory evaluation of wiping performance was carried out by attaching wiper blade rubber provided with a coating layer formed with each of the coating agents of Example 1 and Comparative Examples 1 and 2 to an ordinary automobile windshield wiper, carrying out a wiping operation with the wiper in a state of evenly spraying water at the rate of 100 ml to 500 ml per minute onto the entire wiping surface of the windshield glass of the ordinary automobile, observing the state of streaks remaining when the wiper blade rubber wipes downward from the interior side of the windshield glass, and evaluating wiping in accordance with the following evaluation criteria. Furthermore, prior to the wiping test, the windshield glass was cleaned to obtain an ordinary surface from which wax and coating agent had been removed, followed by obtaining a water-repellent surface by applying a commercially available automobile windshield glass water repellent (Drive Joy®industrial glass coating set, Tacti Corp.) to form a water-repellent coating in accordance with the instructions provided with the water repellent. FIG. 2 is a schematic diagram schematically representing the criteria used for sensory evaluation scores.

Evaluation Score 5: No formation of streaks whatsoever

Evaluation Score 4: Streaks form momentarily and then immediately disappear

Evaluation Score 3: Streaks form at some locations and then immediately disappear Evaluation Score 2: Streaks form at some locations but do not immediately disappear Evaluation Score 1: Streaks form over the entire surface and do not immediately disappear

[Coefficient of Friction (Initial and After Endurance Test) and Rate of Change in Coefficient of Friction)

In addition, an endurance test of the wiper blade system was carried out on wiper blade rubber provided with a coating layer formed from each of the coating agents of Example 1 and Comparative Examples 1 and 2 based on SAE J903 with the surface of ordinary automobile windshield glass in a dry state, followed by measurement of the coefficient of friction at the start of the test (initial) and the coefficient of friction at completion of the endurance test (after endurance test). The rate of change in the coefficient of friction was calculated as the rate of change of the coefficient of friction following completion of the endurance test to the coefficient of friction at the start of use (coefficient of friction after endurance testing/coefficient of friction during initial use).

Figure 3:
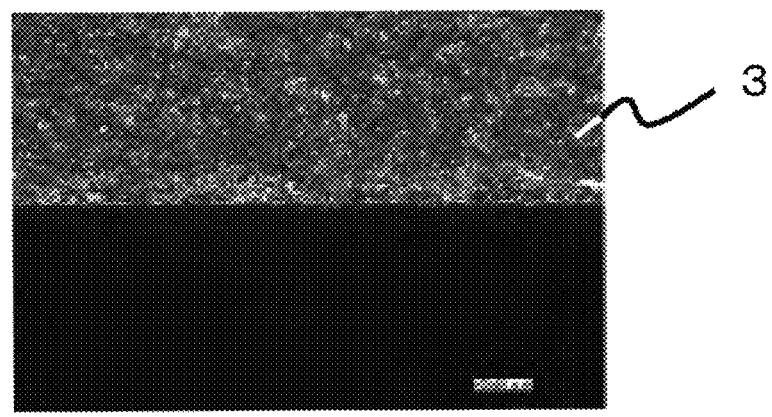
FIG. 3 is a micrograph photographed with a digital microscope (magnification: 200×) of the lateral surface of a lip portion of a wiper blade rubber of Example 1 after an endurance test in the dry state.
Figure 5:
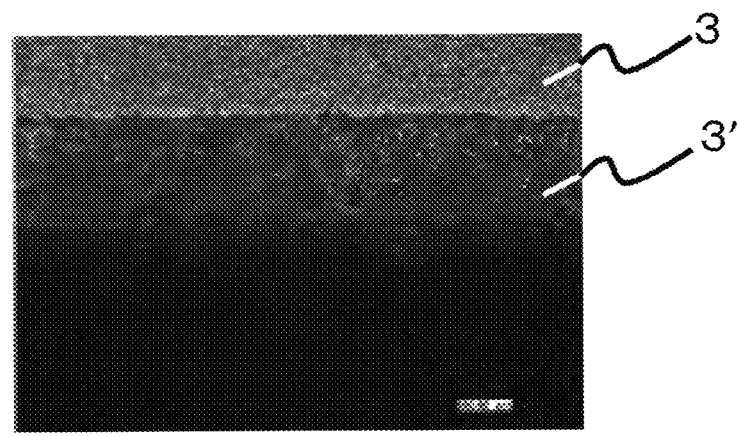
FIG. 5 is a micrograph photographed with a digital microscope (magnification: 200×) of a lateral surface of a lip portion of a wiper blade rubber of Comparative Example 1 after an endurance test in the dry state.
Figure 7:
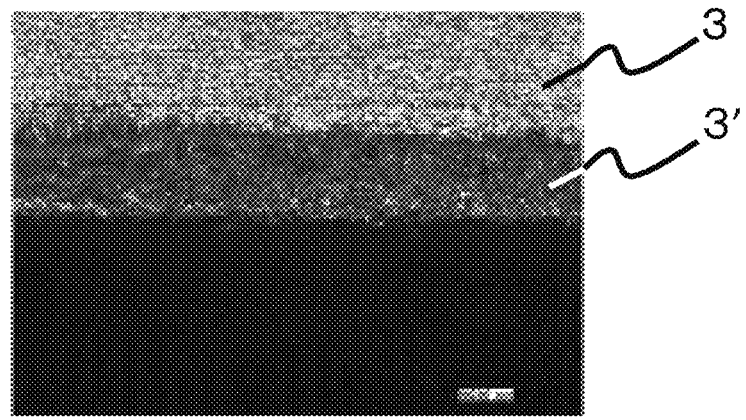
FIG. 7 is a micrograph photographed with a digital microscope (magnification: 200×) of a lateral surface of a lip portion of a wiper blade rubber of Comparative Example 2 after an endurance test in the dry state.

In addition, the lateral surfaces of the lip portion of wiper blade rubber provided with a coating layer formed from each of the coating agents of Example 1 and Comparative Examples 1 and 2 after the test were photographed with a digital microscope (magnification: 200×). The results are shown in FIGS. 3, 5 and 7.

TABLE 3

| Binder | | Example 1 Binder A | Comparative Example 1 Binder B | Comparative Example 2 Binder C |
|---|---|---|---|---|
| Surface roughness | N/mm² | 2.97 | 20.27 | 3.91 |
| Wiping evaluation (ordinary surface) | Score | 5 | 3 | 5 |

TABLE 3-continued

| Binder | | Example 1 Binder A | Comparative Example 1 Binder B | Comparative Example 2 Binder C |
|---|---|---|---|---|
| Wiping evaluation (water-repellent surface) | Score | 5 | 4 | 5 |
| Coefficient of friction (initial) | | — | 0.97 | 1.26 | 1.23 |
| Coefficient of friction (after endurance test) | | — | 1.08 | 1.87 | 2.48 |
| Rate of change of coefficient of friction | Times | 1.11 | 1.49 | 2.02 |

[Discussion of Results]

Figure 4A:
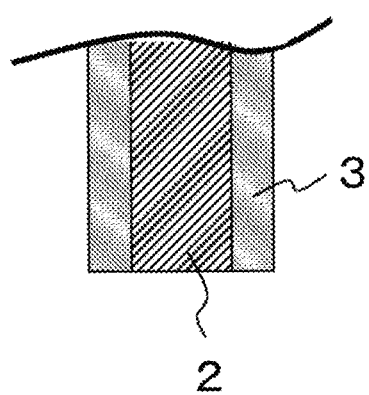
FIG. 4(a) is a cross-sectional view and FIG. 4(b) is an overhead view schematically representing an edge of a lip portion of a wiper blade rubber of Example 1 after an endurance test.
Figure 4B:
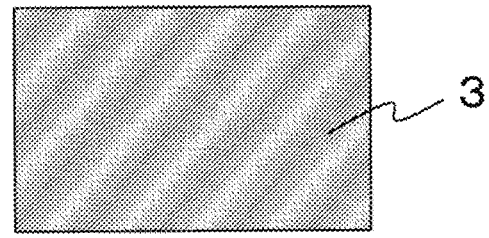

The coating layer formed by the coating agent of Example 1 had a weight ratio of binder solid fraction to solid lubricant of 1:4 and was able to be confirmed to have adequate flexibility despite having a high content of solid lubricant in the coating agent. The wiper blade rubber provided with a coating layer formed by the coating agent of Example 1 demonstrated low friction during initial use and it was ascertained that a desirable coating layer has been formed. In addition, it was ascertained that the wiper blade rubber provided with a coating layer formed by the coating agent of Example 1 was superior in durability, having such a small rate of change in the coefficient of friction after endurance testing relative to the coefficient of friction during initial use (coefficient of friction after endurance testing/coefficient of friction during initial use) as 1.11. In addition, as shown in FIG. 3, the coating layer 3 of this wiper blade rubber did not exhibit wear after use and it was ascertained that it maintained desirable wipeability. FIG. 4 depicts a cross-sectional view (a) and overhead view (b) schematically representing the edge of the wiper blade rubber after endurance testing. As indicated in the overhead view of FIG. 4(b), the coating layer 3 is present over the entire surface in the case the coating layer has not worn even after using the wiper blade rubber. In the photograph shown in FIG. 3, it was ascertained that the coating layer 3 was present over the entire surface.

Figure 6A:
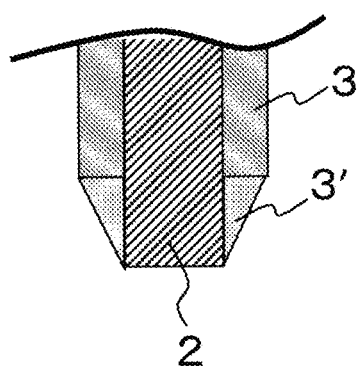
FIG. 6(a) is a cross-sectional view and FIG. 6(b) is an overhead view schematically representing an edge of a lip portion of a wiper blade rubber of Comparative Example 1 or 2 after an endurance test.
Figure 6B:
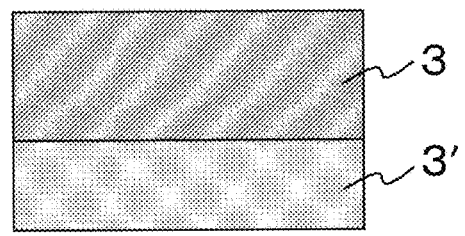

The coating layer formed by the coating agent of Comparative Example 1 had a weight ratio of binder solid fraction to solid lubricant of 1:1, and although it only contained a small amount of solid lubricant, surface hardness was 20 N/mm² or more, the coating layer was hard and the coefficient of friction during initial use was comparatively low. However, a wiper blade rubber provided with a coating layer formed by the coating agent of Comparative Example 1 demonstrated inferior durability compared to that of Example 1, having a large rate of change in the coefficient of friction after endurance testing relative to the coefficient of friction during initial use of 1.48, and wore easily. In addition, the coating layer of Comparative Example 1 demonstrated comparatively poor followability of the wiped surface, and the wiping evaluation score thereof was inferior to Example 1 for both the ordinary surface and water-repellent surface. In addition, as shown in FIG. 5, the coating layer 3 of this wiper blade rubber became worn after use, resulting in the formation of a worn portion 3'. Due to wear of the coating layer 3, the wiper blade rubber provided with the coating layer formed by the coating agent of Comparative Example 1 demonstrated poor wiping performance due to exposure of the base material. FIG. 6 depicts a cross-sectional view (a) and overhead view (b) schematically representing the edge of the wiper blade rubber provided with a coating layer formed by the coating agent of Comparative Example 1 or 2 after endurance testing. As indicated in the cross-sectional view of FIG. 6(a) and the overhead view of FIG. 6(b), a worn portion 3' is formed when the edge of the coating layer 3 becomes worn after use as observed in the wiper blade rubber provided with a coating layer formed by the coating agent of Comparative Example 1 or 2. It was ascertained that the worn portion 3' was present on the edge of the coating layer 3 in the photograph shown in FIG. 5 as well.

The coating layer formed by the coating agent of Comparative Example 2 had a weight ratio of binder solid fraction to solid lubricant of 1:3.5, and despite the high content of solid lubricant in the coating agent, surface hardness was less than 20 N/mm$^2$, the coating layer was soft and the coefficient of friction during initial use was low. In addition, wiping performance was also favorable. However, a wiper blade rubber provided with a coating layer formed by the coating agent of Comparative Example 2 wore easily and demonstrated decreased durability, having an extremely large rate of change in the coefficient of friction after endurance testing relative to the coefficient of friction during initial use of 2.02. In addition, this wiper blade rubber demonstrated poor wiping performance and a large coefficient of friction due to the worn out of coating layer and exposure of the rubber base material caused by the reduction of the solid lubricant content after use. It was assumed that the wiping performance of the coating layer formed by the coating agent of Comparative Example 2 was affected by the content of solid lubricant. In the photograph shown in FIG. 7, the coating layer 3 of a wiper blade rubber provided with a coating layer formed by the coating agent of Comparative Example 2 had become worn, and it was ascertained that the worn portion 3' was present on the edge of the coating layer 3.

[Binders D-1 to D-7]

There were used aqueous polycarbonate-based polyurethane resin dispersions (Ube Industries, Ltd.) containing 30% by weight of a thermal crosslinking polycarbonate-based polyurethane resin as the solid content thereof based on the total weight (100% by weight) of the binder, and containing a dispersion medium consisting of water and N-methylpyrrolidone. Binders D-1 to D-7 are thermal crosslinking aqueous polycarbonate-based polyurethane resin dispersions. As shown in Table 4, each of the aqueous polycarbonate-based polyurethane resin dispersions used in Binders D-1 to D-7 had a total of the content ratio of urethane bonds and the content ratio of urea bonds of 9.6% by weight to 16.7% by weight based on the solid contents thereof. In the present description, the total of the content ratio of urethane bonds and the content ratio of urea bonds in an aqueous polycarbonate-based polyurethane resin dispersion can be measured according to the method indicated below. The viscosity of each of Binders D-1 to D-7 is also shown in Table 4. Respective films composed of each of Binder D-1 to D-7 were formed to a film thickness of 10 μm to 80 μm and width of 5 mm by drying or curing each of Binders D-1 to D-7. The films composed of each of Binder D-1 to D-7 were measured for tensile elasticity in compliance with JIS K7161-1 and measured for tensile strength and elongation in compliance with JIS K7311. The measurement results are shown in Table 4.

[Measurement of Total of Urethane Bond and Urea Bond Content Ratios of Aqueous Polycarbonate-based Polyurethane Resin Dispersion]

There were used aqueous An aqueous polycarbonate-based polyurethane resin dispersion was coated onto a glass plate and dried, 100 mg of the dried product was weighed out therefrom and dissolved in 0.75 mL of hexadeuterodimethyl sulfoxide together with a fixed amount of an external standard and the resultant mixture was subjected to $^1$H-NMR measurement to calculate the total of the content ratio of urethane bonds and the content ratio of urea bonds of the aqueous polycarbonate-based polyurethane resin dispersion from the peaks observed in the $^1$H-NMR measurement. As the external standard, a substance of which the peaks do not overlap with those of each of the aqueous polycarbonate-based polyurethane resins was selected each time out of typically used external standards.

[Binders E-1 to E-4]

There were used aqueous polycarbonate-based polyurethane resin dispersions (Ube Industries, Ltd.) containing 30% by weight of a non-crosslinking polycarbonate-based polyurethane resin as the solid content thereof based on the total weight (100% by weight) of the binder, and containing a dispersion medium consisting of water and N-methylpyrrolidone. Binders E-1 to E-4 are non-crosslinking aqueous polycarbonate-based polyurethane resin dispersions. As shown in Table 5, each of the aqueous polycarbonate-based polyurethane resin dispersions used in Binders E-1 to E-4 had a total of the content ratio of urethane bonds and the content ratio of urea bonds of 10.6% by weight to 18.6% by weight based on the solid contents thereof. The viscosity of these binders E-1 to E-4 is also shown in Table 5. Films composed of each of Binder E-1 to E-4 were formed to a film thickness of 10 μm to 80 μm and width of 5 mm by drying or curing each of Binders E-1 to E-4. The films composed of each of Binders E-1 to E-4 were measured for tensile elasticity in compliance with JIS K7161-1 and measured for tensile strength and elongation in compliance with JIS K7311. The measurement results are shown in Table 5.

TABLE 4

| Binder | | D-1 | D-2 | D-3 | D-4 | D-5 | D-6 | D-7 |
|---|---|---|---|---|---|---|---|---|
| Trade name | | TFK-004 | TFK-011 | TFK-002 | TFK-001 | TFK-005 | TFK-006 | TFE-007 |
| Total of content ratio of urethane bonds and content ratio of urea bonds (based on solid content) | wt% | 9.6 | 11.0 | 10.7 | 152 | 16.0 | 16.0 | 16.7 |
| Viscosity | mPa·s | 25 | 16.8 | 14.3 | 23.7 | 18.3 | 19.4 | 53.5 |
| Film Tensile elasticity | MPa | 26 | 53 | 75 | 200 | 390 | 1090 | 1270 |
| Tensile strength | MPa | 53.6 | 61.3 | 49.8 | 43.7 | 39.7 | 45.2 | 53.5 |
| Elongation | % | 340 | 280 | 250 | 190 | 140 | 130 | 10 |

TABLE 5

| Binder | | | E-1 | E-2 | E-3 | E-4 |
|---|---|---|---|---|---|---|
| | Trade name | | TFK-012 | TFK-009 | TFK-008 | TFK-013 |
| Total of content ratio of urethane bonds and content ratio of urea bonds (based on solid content) | | wt % | 10.7 | 10.6 | 17.7 | 18.6 |
| | Viscosity | mPa·s | 9.41 | 46.3 | 46.1 | 19.9 |
| Film | Tensile elasticity | MPa | 20 | 160 | 400 | 1200 |
| | Tensile strength | MPa | 62.7 | 40.6 | 41.9 | 44.6 |
| | Elongation | % | 400 | 240 | 160 | 120 |

Example 2

Except that the coating agents of Example 2 were each produced by mixing Binder D-1, a solid lubricant and other materials using a homodisperser mixer while changing the weight ratio of the solid fraction of Binder D-1 to the solid lubricant to 1:1, 1:2, 1:3, 1:4, 1:5 or 1:6, the same procedures of the production method as in Example 1 were repeated. Each coating agent had the same formulation as in Example 1 with the exception of changing the weight ratio of the solid fraction of Binder D-1 to the solid lubricant, and thus, each coating agent contained 76.77 parts by weight of an aqueous medium (pure water) and a total of 23.23 parts by weight of Binder D-1 and solid lubricant. Wiper blade rubbers having a coating layer having a film thickness of 5 μm to 12 μm were produced in the same manner as in Example 1 with the exception of using each of the coating agents of Example 2.

Examples 3 to 8

Examples 3 to 8 were produced in the same manner as in Example 2 with the exception of using Binders D-2 to D-7 and changing the weight ratio of the solid fraction of each of the Binders D-2 to D-7 to the solid lubricant to 1:1, 1:2, 1:3, 1:4, 1:5 or 1:6. Wiper blade rubber having a coating layer having a film thickness of 5 μm to 12 μm was produced in the same manner as in Example 1 with the exception of using these coating agents.

Examples 9 to 12

In Examples 9 to 12, coating agents of each example were produced in the same manner as Example 2 with the exception of using Binders E-1 to E-4 and changing the weight ratio of the solid fraction of each of the Binders E-1 to E-4 to the solid lubricant to 1:1, 1:2, 1:3, 1:4, 1:5 or 1:6. Wiper blade rubbers having a coating layer having a film thickness of 5 μm to 12 μm were produced in the same manner as in Example 1 with the exception of using these coating agents.

The coating agents for wiper blade rubber of Examples 2 to 12 and wiper blade rubbers using each of these coating agents were measured for surface hardness, wiping evaluation (ordinary surface, water-repellent surface), coefficient of friction (initial, after endurance testing) and rate of change of coefficient of friction in the same manner as in Example 1. The results of Examples 2 to 8 using a binder containing a crosslinking polycarbonate-based polyurethane resin are shown in Table 6. The results of Examples 9 to 12 using a binder containing a non-crosslinking polycarbonate-based polyurethane resin are shown in Table 7.

TABLE 6

| | | | Example 2 D-1 | Example 3 D-2 | Example 4 D-3 | Example 5 D-4 | Example 6 D-5 | Example 7 D-6 | Example 8 D-7 |
|---|---|---|---|---|---|---|---|---|---|
| 1:1* | Surface hardness | N/mm² | 5.05 | 5.66 | 10.90 | 13.66 | 15.03 | 17.27 | 20.04 |
| | Wiping evaluation (ordinary surface) | Score | 4-5 | 4 | 3-4 | 3-4 | 3-4 | 3 | 2-3 |
| | Wiping evaluation (water-repellent surface) | Score | 5 | 4-5 | 4 | 4 | 4 | 3-4 | 3 |
| | Coefficient of friction (initial) | — | 1.57 | 1.41 | 1.34 | 1.16 | 1.12 | 1.02 | 1.03 |
| | Coefficient of friction (after endurance testing) | — | 1.54 | 1.34 | 1.33 | 1.31 | 1.29 | 1.47 | 1.81 |
| | Rate of change of coefficient of friction | Times | 0.98 | 0.95 | 0.99 | 1.13 | 1.15 | 1.44 | 1.76 |
| 1:2* | Surface hardness | N/mm² | 4.01 | 5.08 | 9.71 | 12.59 | 13.24 | 14.03 | 15.21 |
| | Wiping evaluation (ordinary surface) | Score | 5 | 4-5 | 4 | 3-4 | 3-4 | 3 | 2-3 |
| | Wiping evaluation (water-repellent surface) | Score | 5 | 5 | 4-5 | 4 | 4 | 3-4 | 3 |
| | Coefficient of friction (initial) | — | 1.26 | 1.22 | 1.12 | 1.10 | 1.03 | 1.00 | 1.07 |
| | Coefficient of friction (after endurance testing) | — | 1.29 | 1.31 | 1.18 | 1.20 | 1.31 | 1.33 | 1.52 |
| | Rate of change of coefficient of friction | Times | 1.02 | 1.07 | 1.05 | 1.09 | 1.27 | 1.33 | 1.42 |
| 1:3* | Surface hardness | N/mm² | 3.01 | 3.05 | 5.67 | 6.28 | 6.38 | 6.81 | 7.20 |
| | Wiping evaluation (ordinary surface) | Score | 5 | 5 | 4-5 | 4 | 4 | 3-4 | 3 |
| | Wiping evaluation (water-repellent surface) | Score | 5 | 5 | 5 | 4-5 | 4-5 | 4 | 3-4 |
| | Coefficient of friction (initial) | — | 1.05 | 1.02 | 1.00 | 1.04 | 1.01 | 1.01 | 1.17 |
| | Coefficient of friction (after endurance testing) | — | 1.17 | 1.17 | 1.12 | 1.07 | 1.18 | 1.19 | 1.41 |
| | Rate of change of coefficient of friction | Times | 1.11 | 1.15 | 1.12 | 1.03 | 1.17 | 1.18 | 1.21 |

TABLE 6-continued

|  |  |  | Example 2 D-1 | Example 3 D-2 | Example 4 D-3 | Example 5 D-4 | Example 6 D-5 | Example 7 D-6 | Example 8 D-7 |
|---|---|---|---|---|---|---|---|---|---|
| 1:4* | Surface hardness | N/mm² | 2.93 | 2.97 | 3.01 | 3.05 | 3.10 | 3.82 | 4.52 |
|  | Wiping evaluation (ordinary surface) | Score | 5 | 5 | 5 | 4-5 | 4 | 3-4 | 3 |
|  | Wiping evaluation (water-repellent surface) | Score | 5 | 5 | 5 | 5 | 4-5 | 4 | 3-4 |
|  | Coefficient of friction (initial) | — | 0.96 | 0.98 | 0.97 | 0.94 | 0.99 | 1.02 | 1.27 |
|  | Coefficient of friction (after endurance testing) | — | 1.10 | 1.08 | 1.06 | 1.05 | 1.09 | 1.12 | 1.36 |
|  | Rate of change of coefficient of friction | Times | 1.15 | 1.10 | 1.09 | 1.12 | 1.10 | 1.10 | 1.07 |
| 1:5* | Surface hardness | N/mm² | 2.92 | 2.94 | 2.96 | 3.01 | 3.03 | 3.12 | 3.23 |
|  | Wiping evaluation (ordinary surface) | Score | 5 | 5 | 5 | 5 | 4-5 | 4-5 | 3-4 |
|  | Wiping evaluation (water-repellent surface) | Score | 5 | 5 | 5 | 5 | 5 | 5 | 4 |
|  | Coefficient of friction (initial) | — | 0.98 | 0.99 | 0.94 | 0.94 | 0.98 | 1.07 | 1.35 |
|  | Coefficient of friction (after endurance testing) | — | 1.10 | 1.13 | 1.09 | 1.08 | 1.12 | 1.20 | 1.38 |
|  | Rate of change of coefficient of friction | Times | 1.12 | 1.14 | 1.16 | 1.15 | 1.14 | 1.12 | 1.02 |
| 1:6* | Surface hardness | N/mm² | 2.88 | 2.89 | 2.90 | 2.92 | 2.93 | 2.99 | 2.99 |
|  | Wiping evaluation (ordinary surface) | Score | 5 | 5 | 5 | 5 | 5 | 5 | 3-4 |
|  | Wiping evaluation (water-repellent surface) | Score | 5 | 5 | 5 | 5 | 5 | 5 | 4 |
|  | Coefficient of friction (initial) | — | 0.95 | 0.91 | 0.95 | 0.94 | 1.00 | 1.11 | 1.38 |
|  | Coefficient of friction (after endurance testing) | — | 1.15 | 1.18 | 1.15 | 1.18 | 1.19 | 1.36 | 1.57 |
|  | Rate of change of coefficient of friction | Times | 1.21 | 1.30 | 1.21 | 1.26 | 1.19 | 1.23 | 1.14 |

*Ratio of binder solid fraction: solid lubricant

TABLE 7

|  |  |  | Example 9 E-1 | Example 10 E-2 | Example 11 E-3 | Example 12 E-4 |
|---|---|---|---|---|---|---|
| 1:1* | Surface hardness | N/mm² | 4.99 | 12.32 | 15.07 | 15.98 |
|  | Wiping evaluation (ordinary surface) | Score | 5 | 4-5 | 4 | 3-4 |
|  | Wiping evaluation (water-repellent surface) | Score | 5 | 5 | 4-5 | 4 |
|  | Coefficient of friction (initial) | — | 1.62 | 1.95 | 1.66 | 1.47 |
|  | Coefficient of friction (after endurance testing) | — | 1.83 | 2.04 | 1.71 | 1.52 |
|  | Rate of change of coefficient of friction | Times | 1.13 | 1.05 | 1.03 | 1.03 |
| 1:2* | Surface hardness | N/mm² | 4.48 | 10.62 | 12.45 | 13.11 |
|  | Wiping evaluation (ordinary surface) | Score | 5 | 4-5 | 4 | 3-4 |
|  | Wiping evaluation (water-repellent surface) | Score | 5 | 5 | 4-5 | 4 |
|  | Coefficient of friction (initial) | — | 2.14 | 1.71 | 1.41 | 1.25 |
|  | Coefficient of friction (after endurance testing) | — | 2.12 | 1.88 | 1.57 | 1.41 |
|  | Rate of change of coefficient of friction | Times | 0.99 | 1.10 | 1.11 | 1.13 |
| 1:3* | Surface hardness | N/mm² | 2.90 | 6.03 | 6.45 | 6.60 |
|  | Wiping evaluation (ordinary surface) | Score | 5 | 5 | 4-5 | 4 |
|  | Wiping evaluation (water-repellent surface) | Score | 5 | 5 | 5 | 4-5 |
|  | Coefficient of friction (initial) | — | 2.01 | 1.65 | 1.32 | 1.21 |
|  | Coefficient of friction (after endurance testing) | — | 1.99 | 1.73 | 1.44 | 1.37 |
|  | Rate of change of coefficient of friction | Times | 0.99 | 1.05 | 1.09 | 1.13 |

TABLE 7-continued

|  |  |  | Example 9 E-1 | Example 10 E-2 | Example 11 E-3 | Example 12 E-4 |
|---|---|---|---|---|---|---|
| 1:4* | Surface hardness | N/mm² | 2.85 | 3.07 | 3.11 | 3.65 |
|  | Wiping evaluation (ordinary surface) | Score | 5 | 5 | 5 | 4-5 |
|  | Wiping evaluation (water-repellent surface) | Score | 5 | 5 | 5 | 5 |
|  | Coefficient of friction (initial) | — | 1.74 | 1.53 | 1.29 | 1.26 |
|  | Coefficient of friction (after endurance testing) | — | 1.83 | 1.51 | 1.46 | 1.33 |
|  | Rate of change of coefficient of friction | Times | 1.05 | 0.99 | 1.13 | 1.06 |
| 1:5* | Surface hardness | N/mm² | 2.80 | 3.01 | 3.08 | 3.11 |
|  | Wiping evaluation (ordinary surface) | Score | 5 | 5 | 5 | 5 |
|  | Wiping evaluation (water-repellent surface) | Score | 5 | 5 | 5 | 5 |
|  | Coefficient of friction (initial) | — | 1.44 | 1.31 | 1.25 | 1.24 |
|  | Coefficient of friction (after endurance testing) | — | 1.52 | 1.49 | 1.54 | 1.67 |
|  | Rate of change of coefficient of friction | Times | 1.06 | 1.14 | 1.23 | 1.35 |
| 1:6* | Surface hardness | N/mm² | 2.70 | 2.89 | 2.95 | 2.97 |
|  | Wiping evaluation (ordinary surface) | Score | 5 | 5 | 5 | 5 |
|  | Wiping evaluation (water-repellent surface) | Score | 5 | 5 | 5 | 5 |
|  | Coefficient of friction (initial) | — | 1.18 | 1.16 | 1.29 | 1.37 |
|  | Coefficient of friction (after endurance testing) | — | 1.59 | 1.64 | 1.83 | 2.19 |
|  | Rate of change of coefficient of friction | Times | 1.35 | 1.41 | 1.42 | 1.60 |

*Ratio of binder solid fraction: solid lubricant

As shown in Tables 6 and 7, it was ascertained that the wiper blade rubbers using a coating agent comprising a binder containing a crosslinking polycarbonate-based polyurethane resin or non-crosslinking polycarbonate-based polyurethane resin, and a solid lubricant, demonstrated superior friction performance that permits maintaining low friction both initially and during use for extended periods, superior wiping performance that permits adequately inhibiting uneven wiping and wiping noise, and superior durability of inhibiting wear and the like.

Example 13

Each of the coating agents of Example 13 was produced in the same manner as in Example 2 with the exception of using Binder D-4 and mixing the Binder D-4, solid lubricant and other materials while changing the weight ratio of the solid fraction of Binder D-4 to the solid lubricant to 1:7 or 1:8. Wiper blade rubbers having a coating layer having a film thickness of 5 μm to 12 μm were produced in the same manner as in Example 1 with the exception of using each of these coating agents.

Example 14

Each of the coating agents of Example 14 was produced in the same manner as in Example 2 with the exception of using Binder E-3 and changing the weight ratio of the solid fraction of Binder E-3 to the solid lubricant to 1:7 or 1:8. Wiper blade rubbers having a coating layer having a film thickness of 5 μm to 12 μm were produced in the same manner as in Example 1 with the exception of using each of these coating agents.

The coating agents for wiper blade rubber of Examples 13 and 14 and wiper blade rubbers using each of these coating agents were measured for surface hardness, wiping evaluation (ordinary surface, water-repellent surface), coefficient of friction (initial, after endurance testing) and rate of change of coefficient of friction in the same manner as in Example 1. The results are shown in Table 8.

|  |  |  | Example 13 D-4 | Example 14 E-3 |
|---|---|---|---|---|
| 1:7* | Surface hardness | N/mm² | 2.89 | 2.91 |
|  | Wiping evaluation (ordinary surface) | Score | 5 | 5 |
|  | Wiping evaluation (water-repellent surface) | Score | 5 | 5 |
|  | Coefficient of friction (initial) | — | 0.95 | 1.29 |
|  | Coefficient of friction (after endurance testing) | — | 1.37 | 1.98 |
|  | Rate of change of coefficient of friction | Times | 1.44 | 1.53 |
| 1:8* | Surface hardness | N/mm² | 2.88 | 2.9 |
|  | Wiping evaluation (ordinary surface) | Score | 5 | 5 |
|  | Wiping evaluation (water-repellent surface) | Score | 5 | 5 |
|  | Coefficient of friction (initial) | — | 0.94 | 1.33 |
|  | Coefficient of friction (after endurance testing) | — | 1.81 | 2.27 |
|  | Rate of change of coefficient of friction | Times | 1.92 | 1.71 |

*Ratio of binder solid fraction: solid lubricant

As shown in Table 8, it was ascertained that the wiper blade rubbers using a coating agent comprising a binder containing a crosslinking polycarbonate-based polyurethane resin or non-crosslinking polycarbonate-based polyurethane resin, and a solid lubricant, demonstrate superior friction performance that permits maintaining low friction both initially and during use for extended periods, superior wiping performance that permits adequately inhibiting uneven wiping and wiping noise, and superior durability of inhibiting wear and the like, even in the case of such a high content of solid lubricant that the ratio of binder solid fraction to solid lubricant in the coating agent is 1:7 or 1:8. Examples 13 and 14, which had such a high content of solid lubricant that the weight ratio of binder solid fraction to solid lubricant in the coating agents was 1:7 or 1:8, showed a rate of change in coefficient of friction of higher than 1.2 times, a tendency of poorly keeping a low friction and a slightly reduced durability in comparison with Examples 2 to 8 and Examples 9 to 12.

[Binder F]

The following two aqueous polycarbonate-based polyurethane resin dispersions were used for Binder F.

(1) Aqueous Polycarbonate-Based Polyurethane Resin Dispersion f-1

There was used an aqueous polycarbonate-based polyurethane resin dispersion (Eternacoll® UW-1501F, Ube Industries, Ltd.) containing 30% by weight as the solid content thereof of a thermal crosslinking polycarbonate-based polyurethane resin based on 100% by weight of the resin dispersion, and a dispersion medium consisting of water and N-methylpyrrolidone.

(2) Aqueous Polycarbonate-Based Polyurethane Resin Dispersion f-2

There was used an aqueous polycarbonate-based polyurethane resin dispersion (Etemacoll® UW-5002, Ube Industries, Ltd.) containing 30% by weight as the solid content thereof of a non-crosslinking polycarbonate-based polyurethane resin based on 100% by weight of the resin dispersion, and a dispersion medium consisting of water and N-methylpyrrolidone.

Binder F was produced by mixing the two aqueous polycarbonate-based polyurethane resin dispersions f-1 and f-2 so that tensile elasticity, determined in compliance with JIS K7161-1 of a film composed of Binder F having a film thickness of 10 μm to 80 μm and a width of 5 mm, was 300 MPa. The solid content of Binder F was 30% by weight. The viscosity of Binder F was measured. A film composed of Binder F having a film thickness of 10 μm to 80 μm and a width of 5 mm was formed by drying or curing the Binder F. The film composed of Binder F was measured for tensile elasticity in compliance with JIS K7161-1 and measured for tensile strength and elasticity in compliance with JIS K7311. The measurement results are shown in Table 9.

Example 15

The coating agent of Example 15 was produced in the same manner as in Example 2 with the exception of using Binder F and changing the weight ratio of the solid fraction of Binder F to the solid lubricant to 1:4. A wiper blade rubber having a coating layer having a film thickness of 5 μm to 12 μm was produced in the same manner as in Example 1 with the exception of using these coating agents.

The coating agent for wiper blade rubber of Example 15 and wiper blade rubber using this coating agent were measured for surface hardness, wiping evaluation (ordinary surface, water-repellent surface), coefficient of friction (initial, after endurance testing) and rate of change of coefficient of friction in the same manner as in Example 1. The results of Example 15 using a binder containing a crosslinking polycarbonate-based polyurethane resin and a non-crosslinking polycarbonate-based polyurethane resin are shown in Table 9.

TABLE 9

| | Binder | | Example 15 F |
|---|---|---|---|
| Film 1:4* | Viscosity | mPa · s | 30.5 |
| | Tensile elasticity | MPa | 300 |
| | Tensile strength | MPa | 58.1 |
| | Elongation | % | 220 |
| | Surface hardness | N/mm² | 3.08 |
| | Wiping evaluation (ordinary surface) | Score | 5 |
| | Wiping evaluation (water-repellent surface) | Score | 5 |
| | Coefficient of friction (initial) | — | 0.98 |
| | Coefficient of friction (after endurance testing) | — | 1.11 |
| | Rate of change of coefficient of friction | Times | 1.13 |

*Ratio of binder solid fraction: solid lubricant

As shown in Table 9, it was ascertained that a wiper blade rubber that uses a coating agent comprising a binder containing a crosslinking polycarbonate-based polyurethane resin and a non-crosslinking polycarbonate-based polyurethane resin, and a solid lubricant, demonstrates superior friction performance that permits maintaining low friction both initially and during use for extended periods, superior wiping performance that permits adequately inhibiting uneven wiping and wiping noise, and superior durability of inhibiting wear and the like.

INDUSTRIAL APPLICABILITY

According to the present invention, a coating agent for wiper blade rubber, which demonstrates superior friction performance that permits maintaining a low level of friction both initially and during use for extended periods, superior wiping performance that permits adequately inhibiting uneven wiping and wiping noise, and superior durability of inhibiting wear, and a wiper blade rubber that uses that coating agent, can be provided. Therefore, the present invention is industrially useful.

BRIEF DESCRIPTION OF THE REFERENCE SYMBOLS

1 Tandem-shaped wiper blade rubber base material
2 Lip portion
3 Coating layer
3' Worn portion
4 Cut portion

The invention claimed is:
1. A coating agent for a wiper blade rubber comprising:
a binder containing a polycarbonate-based polyurethane resin; and
a solid lubricant,
the coating agent having a weight ratio of a solid fraction of the binder to the solid lubricant within a range of 1:2 to 1:8;
wherein the binder has a tensile elasticity of at least 20 MPa and less than 1,090 MPa, as determined by JIS K7161-1 using a film having a film thickness of 10 μm to 80 μm and a width of 3 mm to 20 mm obtained by drying or curing the binder, and wherein the binder has an elongation of at least 140%, as determined by JIS K7311 using a film having a film thickness of 10 μm to 80 μm and a width of 3 mm to 20 mm obtained by drying or curing the binder.

2. The coating agent for a wiper blade rubber according to claim 1, wherein the polycarbonate-based polyurethane resin is at least one of a crosslinking polycarbonate-based polyurethane resin and a non-crosslinking polycarbonate-based polyurethane resin.

3. The coating agent for a wiper blade rubber according to claim 1, wherein the solid lubricant is graphite having an average particle diameter ($D_{50}$) of 2 μm to 15 μm as measured according to a laser diffraction scattering method.

4. The coating agent for a wiper blade rubber according to claim 1, wherein the polycarbonate-based polyurethane resin is dispersed in an aqueous medium.

5. The coating agent for a wiper blade rubber according to claim 1, wherein the binder has a tensile strength of at least 35 MPa as determined by JIS K7311 using a film having a film thickness of 10 μm to 80 μm and a width of 3 mm to 20 mm obtained by drying or curing the binder.

6. The coating agent for a wiper blade rubber according to claim 2, wherein the solid lubricant is graphite having an average particle diameter ($D_{50}$) of 2 μm to 15 μm as measured according to a laser diffraction scattering method.

7. The coating agent for a wiper blade rubber according to claim 2, wherein the polycarbonate-based polyurethane resin is dispersed in an aqueous medium.

8. The coating agent for a wiper blade rubber according to claim 3, wherein the polycarbonate-based polyurethane resin is dispersed in an aqueous medium.

9. The coating agent for a wiper blade rubber according to claim 2, wherein the binder has a tensile strength of at least 35 MPa as determined by JIS K7311 using a film having a film thickness of 10 μm to 80 μm and a width of 3 mm to 20 mm obtained by drying or curing the binder.

10. The coating agent for a wiper blade rubber according to claim 3, wherein the binder has a tensile strength of at least 35 MPa as determined by JIS K7311 using a film having a film thickness of 10 μm to 80 μm and a width of 3 mm to 20 mm obtained by drying or curing the binder.

11. The coating agent for a wiper blade rubber according to claim 4, wherein the binder has a tensile strength of at least 35 MPa as determined by JIS K7311 using a film having a film thickness of 10 μm to 80 μm and a width of 3 mm to 20 mm obtained by drying or curing the binder.

12. A wiper blade rubber having, on lateral surfaces of a lip portion thereof, a coating layer comprising the coating agent for a wiper blade rubber according to claim 1.

13. The wiper blade rubber according to claim 12, wherein the coating layer has a thickness of 3 μm to 30 μm.

* * * * *